J. W. SCHATZ.
ANTIFRICTION BEARING.
APPLICATION FILED MAR. 22, 1919.
1,324,756.
Patented Dec. 9, 1919.
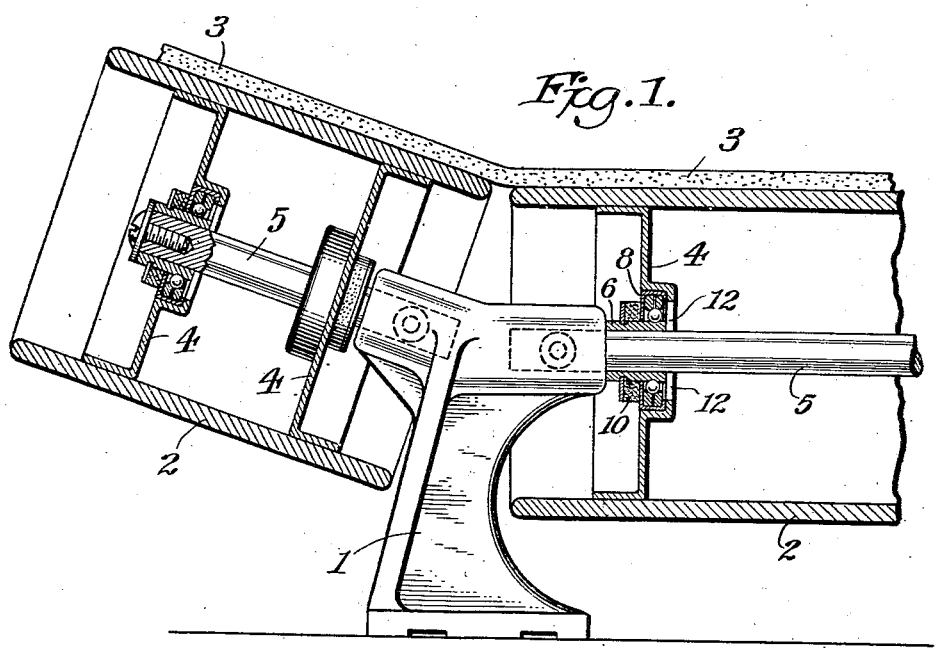
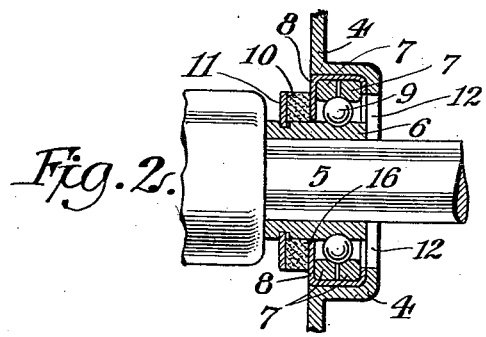
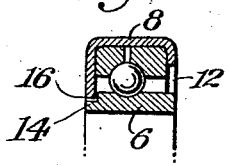
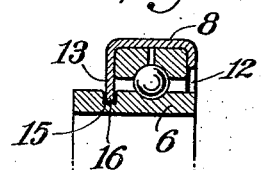
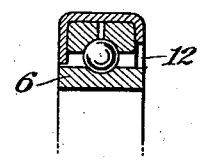
Inventor,
John W. Schatz.
By Phillips Abbott.
Attorney.

UNITED STATES PATENT OFFICE.

JOHN W. SCHATZ, OF POUGHKEEPSIE, NEW YORK, ASSIGNOR OF ONE-THIRD TO HERRMAN A. SCHATZ AND ONE-THIRD TO GROVER H. SCHATZ, BOTH OF POUGHKEEPSIE, NEW YORK.

ANTIFRICTION-BEARING.

1,324,756.      Specification of Letters Patent.      Patented Dec. 9, 1919.

Application filed March 22, 1919. Serial No. 284,367.

*To all whom it may concern:*

Be it known that I, JOHN W. SCHATZ, a citizen of the United States, and a resident of the city of Poughkeepsie, county of Dutchess, and State of New York, have invented certain new and useful Improvements in Antifriction-Bearings, of which the following is a specification, reference being had to the accompanying drawings.

This invention is applicable to a great variety of uses, but it will be found especially beneficial in circumstances where dust, gritty or gummy substances are apt to get into the bearings, thus producing abrasion or clogging thereof, as, for instance, in bearings for carrier belt rollers used in mines, cement works, chemical works, and the like, or in apparatus for handling adhesive or gummy substances, such as syrup, glue, milk, cream and the like. It is the purpose of this invention, therefore, to provide the bearing with means whereby its interior will be sealed against the admission of any objectional substance thereto or the escape of the lubricant therefrom.

Referring to the drawings, Figure 1 is an elevation, partly in vertical section, of a belt carrier showing two of the rollers thereof embodying my improved bearing; Fig. 2 is an elevation, partly in vertical section, somewhat enlarged, of a portion of a shaft and a bearing embodying my invention; Figs. 3, 4 and 5 are sectional views showing modified constructions of the parts more immediately involved in the invention.

In the drawings 1 represents a base casting, bracket or similar part supporting a belt carrier, 2, 2, the rollers of the belt carrier, 3 the belt, 4, 4, the usual webs within the rollers for the support of the bearings, 5, 5, the shaft or axis upon which the rollers 2 rotate. All of the foregoing parts are or may be of any preferred construction. Those illustrated are given as examples merely of forms commonly used. The webs 4, as clearly shown in Figs. 1 and 2, support the bearings, in this case shown as ball bearings. They comprise, in the example shown, an inner race member or cone 6, an outer race member consisting of two cup rings 7, 7, an exterior jacket 8, which incloses the cup rings and holds them in position, a series of balls 9, a packing or sealing device 10, and a washer or other confiner 11, for the sealing device. In the example shown it is only necessary to protect the bearing against gritty substance entering at the end of the rollers 2 because the webs 4 preclude the presence of these objectionable substances in the space within the roller and between the webs. Therefore an open space 12 may, if desired, be left at the inside of the bearing, but the other or outer side is sealed against the entrance of these objectionable materials by extending the outside flange 13 of the jacket 8 inwardly into close proximity to the inner race member or cone 6, and I preferably provide in the member or cone either a shoulder 14, see Fig. 3, or a groove 15, see Fig. 4, within which, or in close proximity to which the inner edge 16 of the jacket 8 may extend, so that it will act as a shield or seal to prevent the entrance of objectionable matter from the exterior to the interior. If such objectionable matter should be of an exceedingly fine or pulverulent character, I effect its exclusion, as well as coarser material and also the exclusion of undesirable liquid or semi-liquid material by adding a packing in the form of a felt or other washer 10, see Fig. 2, which will be held with sufficient snugness against the inwardly extending flange of the jacket 8 by a suitable confiner 11, which may be made in the form of a split metallic ring, which will serve to hold the washer 10, or other packing, against the flange of the jacket, so as to exclude the entrance or exit of material as stated, without interfering with the free rotation of the rollers 2 and the exterior parts of the bearing. Such packing will also beneficially prevent the escape of the lubricating material from the bearing, if the same be used.

It will be obvious to those who are familiar with such matters that the specific construction and arrangement of the apparatus shown in the drawings and described herein illustrate one form only in which my invention may be utilized. For example, the inwardly extended flange of the jacket may be present on both sides of the bearing, if it is desired to exclude the entrance of foreign matter from both sides. Also the invention is as applicable to roller bearings as to ball bearings. Also it is immaterial whether the shaft or axis be stationary and the bearing rotate about it, or the bearing stationary and the shaft or axis turn in it. Also instead of the flanges of the jacket being extended inwardly as stated, added pieces, such as suitably perforated and proportioned disks or their equivalent, may be attached to the sides of the bearing. The essentials of the invention are that there shall be a suitable part or parts extending from the outer portions of the jacket inwardly into sufficiently close proximity to the inner race member or cone as to exclude the entrance of objectionable foreign matter and also the employment in conjunction therewith, when desired, of supplemental sealing devices adapted to exclude finer, pulverulent, liquid or semi-liquid matter. I therefore do not limit myself to the details shown and described.

I claim:

1. An antifriction bearing embodying an inner race member, an outer race member, antifriction devices between the race members, an exterior one piece jacket which embraces, confines and supports the outer race member and means extending from the outer parts of the jacket inwardly approximately to the inner race member, for the purposes set forth.

2. An antifriction bearing embodying an inner race member, an outer race member, antifriction devices between the race members, an exterior one piece jacket which embraces, confines and supports the outer race member, means extending from the outer parts of the jacket inwardly approximately to the inner race member, and sealing devices covering the joint between said means and the inner race member, for the purposes set forth.

3. An antifriction bearing embodying an inner race member, an outer race member, antifriction devices between the race members and an exterior one piece jacket which embraces, confines and supports the outer race member and extends therefrom inwardly approximately to the inner race member, for the purposes set forth.

4. An antifriction bearing embodying an inner race member, an outer race member, antifriction devices between the race members, an exterior one piece jacket which embraces, confines the outer race member and extends therefrom inwardly approximately to the inner race member, and sealing devices covering the joint between the jacket and the inner race member to prevent the entrance and escape of material thereat, for the purposes set forth.

5. An antifriction bearing embodying an inner race member, an outer race member, a shoulder on the inner race member, antifriction devices between the race members and an exterior one piece jacket which embraces, confines and supports the outer race member and extends therefrom inwardly approximately to the inner race member and adjacent to the shoulder thereon, for the purposes set forth.

6. An antifriction bearing embodying an inner race member, an outer race member, antifriction devices between the race members and an exterior one piece jacket which surrounds, confines and supports the outer race member and extends therefrom inwardly approximately to the inner race member and which holds all parts separably in proper position, for the purposes set forth.

7. An antifriction bearing embodying an inner race member, an outer race member, antifriction devices between the race members, an exterior one piece jacket which embraces, confines and supports the outer race member and extends therefrom approximately to the inner race member, means covering the joint between the jacket and the inner race member to prevent the entrance and escape of material thereat and means to hold said last named means in position.

8. An antifriction bearing embodying an inner race member, an outer race member, a shoulder on the inner race member, antifriction devices between the race members, an exterior one piece jacket which embraces, confines and supports the outer race member and extends therefrom inwardly approximately to the inner race member and adjacent to the shoulder thereon, a sealing device to prevent the entrance and escape of material at the joint between the jacket and the inner race member, and means supported by the inner race member to hold said sealing device in position.

In testimony whereof I have signed my name to this specification.

JOHN W. SCHATZ.